July 21, 1959 D. ENDE 2,895,515
MITER JIG ATTACHMENT FOR TABLE SAWS
Filed Nov. 7, 1957 2 Sheets-Sheet 1

INVENTOR.
DON ENDE
BY
ATTORNEY

July 21, 1959  D. ENDE  2,895,515
MITER JIG ATTACHMENT FOR TABLE SAWS
Filed Nov. 7, 1957  2 Sheets-Sheet 2

INVENTOR.
DON ENDE
BY
Zoltan H. Holscher
ATTORNEY

2,895,515
MITER JIG ATTACHMENT FOR TABLE SAWS

Don Ende, Brooklyn, N.Y.

Application November 7, 1957, Serial No. 694,989

2 Claims. (Cl. 143—169)

This invention relates to the art of table saws and particularly concerns a miter jig attachment for a saw table.

According to the invention there is provided a saw table having a pair of parallel grooves therein. A rectangular frame includes a pair of parallel rails which slide in the grooves in the table. An angle bar is provided to serve as a work guide. This angle bar may be secured to the frame at any desired angle depending on the miter angle to be cut in the work by the saw. The angle bar carries a removable stop member for retaining one end of the work. The rails are provided with a plurality of threaded apertures and the angle bar has a plurality of holes therein, so that bolts can be passed through the angle bar into the threaded apertures to secure the angle bar to the frame.

It is, therefore, a principal object of the invention to provide a saw table with a slidable miter jig frame.

It is a further object to provide a rectangular miter jig frame for a saw table.

It is a further object to provide a jig for a saw table, the jig including rails slidable in grooves in the table, and an angle bar angularly disposable on the rails and slidable therewith during the cutting of a piece of work.

It is a still further object to provide a miter jig of the character described with an angle bar of adjustable length for guiding the work during cutting thereof.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figures 1, 2:
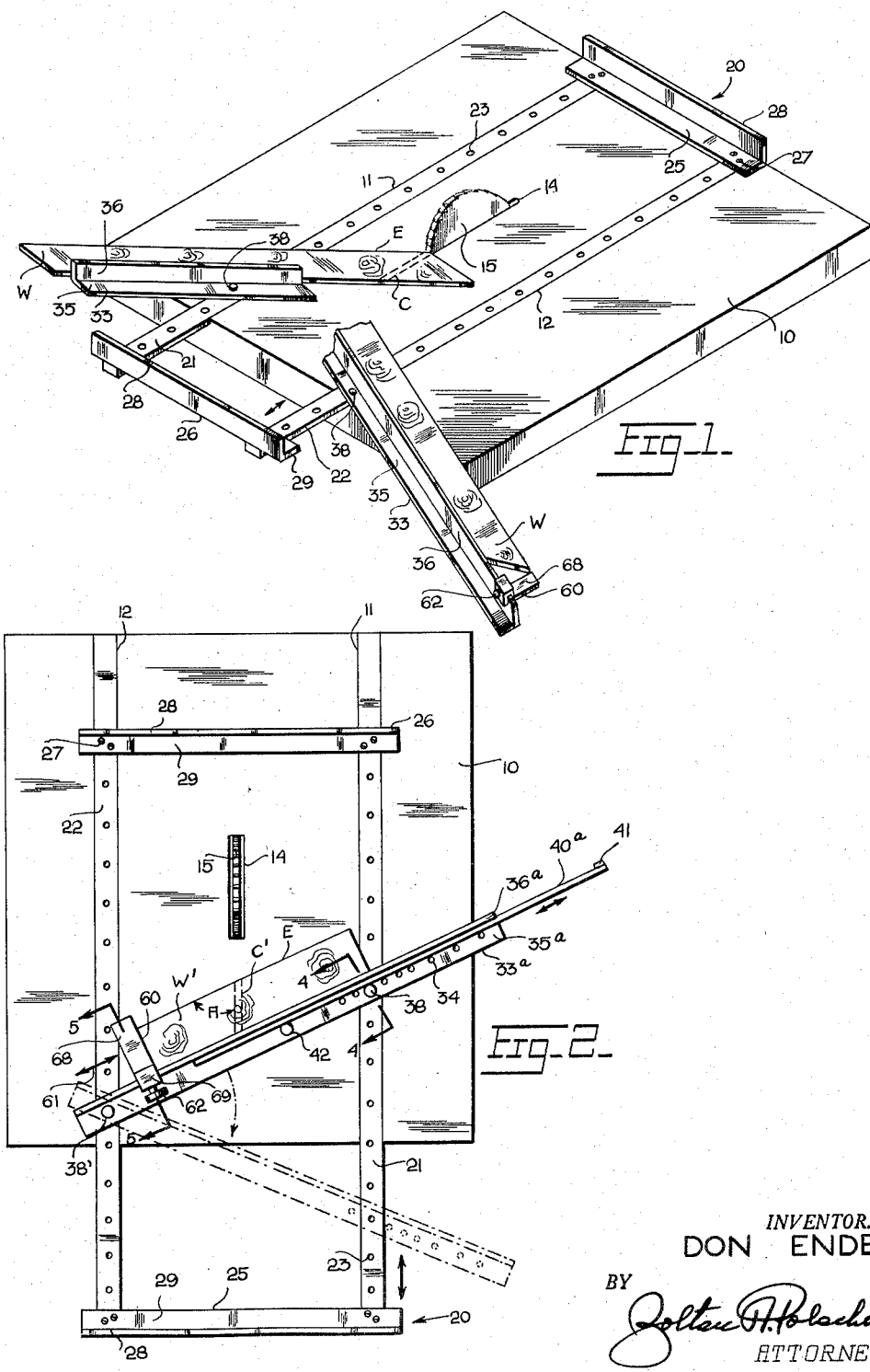
Fig. 1 is a perspective view of a saw table and miter jig embodying the invention.
Fig. 2 is a top plan view of the saw table and another form of miter jig.
Figure 5:
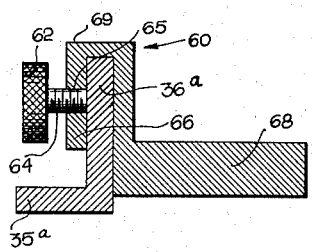
Figure 4:
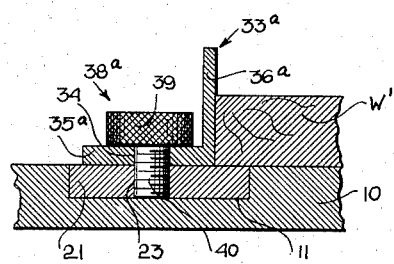

Figs. 4 and 5 are sectional views taken on lines 4—4 and 5—5, respectively, of Fig. 2.

Figure 6:
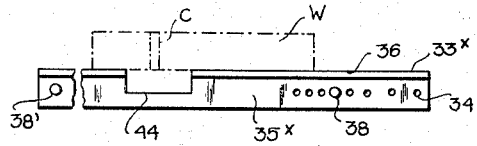
Figure 7:
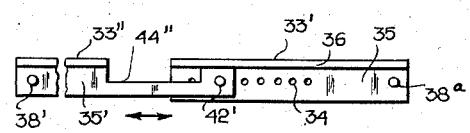

Figs. 6 and 7 are side views of modified forms of angle bars.

Figure 3:
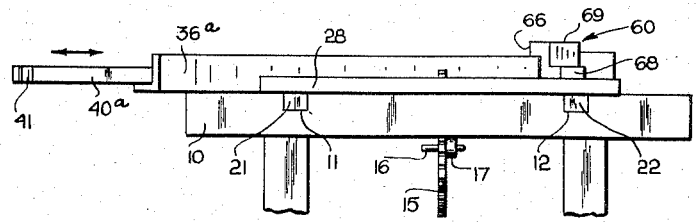
Fig. 3 is an end view of the saw table and miter jig of Fig. 2.

Referring to the drawings, there is shown in Figs. 1, 2 and 3, a rectangular saw table 10 having a pair of straight parallel grooves 11 and 12 therein extending from end to end of the table. The grooves extend parallel to a centrally located slot 14 in the table through which slot extends the top cutting end of a rotatable saw blade 15. The blade is rotatably mounted on a shaft 16 and is caused to rotate by conventional motor drive means (not shown). The plane of the blade is parallel to the grooves 11 and 12. A nut 17 holds the blade 15 on the threaded stud end of the shaft.

A rectangular frame 20 is provided with a pair of straight parallel rails 21 and 22. These rails are slidably disposed in the grooves 11 and 12. The rails each have a plurality of spaced threaded holes 23 arranged in alignment along the lengths thereof. The rails are rectangular in cross section. However, if the grooves 11 and 12 are formed with non-parallel sides such as dovetailed, then the sides of the rails will slant in corresponding fashion.

A pair of transversely disposed angle bars 25 and 26 are secured at the opposite ends of the rails by screws 27. Each of bars 25, 26 has its base flange 29 secured to the rails by the screws 27 and its outer upstanding wall 28 is located in a vertical plane. The wall 28 of each of the angle bars serves as a handle for grasping the frame and moving it during cutting of the work piece W, shown as a rectangular wood board in Figs. 1 and 2.

Another angle bar 33 is provided for serving as a work guide. Referring now specifically to Fig. 1, bar 33 may have a single hole in base flange 35 through which is extended the shank of bolt 38. In actual practice only one angle bar will be required, but two angle bars 33 are shown in Fig. 1 to illustrate two alternative positions of the angle bar. When the bolt 38 is loosened, bar 33 can be adjusted to produce any desired miter cut C in the work W. The bolt 38 may be tightened when the angle bar 33 is set at a desired angle with respect to the plane of saw blade 15.

In the arrangement of Fig. 2, bar 33$^a$ has a plurality of holes 34 disposed along the length of the bar in the base flange 35$^a$ of the bar. The work piece W' rests against the upstanding wall 36 of the angle bar 33$^a$. In order to secure the bar 33$^a$ removably to either of rails 21 or 22 in a desired angular position, there are provided two bolts 38$^a$ and 38' each having a knurled head 39 and a threaded shank 40 which may be threaded in one of the apertures 23 as best shown in Fig. 4. Bolts 38$^a$, 38' can be tightened by means of a wrench or by hand to lock the bar 33$^a$ in any desired angular position with respect to blade 15 and rails 21 and 22 to produce a miter cut C' forming a desired angle A with respect to the edge E of the work piece as indicated in Fig. 2.

By means of the bolts 38$^a$, 38', the angle bar 33$^a$ may be disposed in any desired angular position with respect to the plane of the saw blade, as indicated by dotted lines in Fig. 2, to produce angular miter cuts C' such as 30°, 45°, 60°, etc. The apertures 23 and 34 are so spaced that the miter cuts C' can be produced at any desired angles in increments of 5° or even smaller angular increments. The positioning of bolts 38$^a$, 38' will determine the angular disposition of the angle bar 33$^a$ and thus will fix the miter cut angle.

A stop member 60 is removably disposed on the angle bar 35 and is slidable therealong as indicated by arrow 61 in Fig. 2 when the holding bolt 62 is loosened. This stop member and bolt, as best shown in Fig. 5, has an inverted U-shaped wall portion 69 which fits over the upstanding wall 36 and slides therealong when the bolt 62 is loosened. Bolt 62 has a threaded shank 64 which is threaded in an aperture 65 in the inner free depending wall portion 66. A stop plate or bar 68 is formed integrally with the U-shaped wall portion 69 of the stop member 60 and extends outwardly therefrom perpendicular to wall 36 of the angle bar 33$^a$. This stop plate is used as a rest for the end of the work piece W' during the cutting of the work piece.

In operation, any desired numbers of work pieces can be cut at the same fixed miter cut angle A, once the angle bar 33$^a$ has been fixed in position by fastening bolts 38$^a$, 38'.

It will be noted that the transverse bars 25 and 26 are located on the tops of the rails so that they ride over the table 10. If desired, these bars can be elevated over the rails so that they clear the top edge of the saw blade. Then the frame can be pushed wholly across the table without the bars 25, 26 being cut by the saw blade. If the transverse bars are substantially flush with the table 10, then the blade 15 must be lowered on its shaft 16 so that its top edge does not protrude from the slot 14, to permit the bars to move across the table. In general it will not be necessary to move the miter frame completely across the table in ordinary use, since the frame can be easily lifted out of the grooves 11 and 12 when it is desired to remove it from the table.

A rail 40ª is provided for slidable movement along bar 33ª at the intersections of flange 35 and wall 36. This rail is guided in movement by the head of bolt 38ª and by the head of another fixed bolt 42. The rail 40 has a terminal head 41 extending laterally with its outer surface coplanar with the surface of wall 36 along which the work W' is placed. By means of rail 40ª, work pieces of extended length may be accommodated on the miter jig.

In Fig. 6, flange plate 35ˣ has a rectangular recess 44 cut therein. This provides a space for the saw blade 15 to extend past the work piece W and complete the cut C without cutting into the angle bar 33ˣ.

In Fig. 7, a two-piece angle bar is provided consisting of the section 33' and another section 33". Recess 44" is formed in base plae 35' of section 33". Bolt 42' serves to secure the angle bar sections 33' and 33" adjustably together at the required length with bolts 38ª and 38' located in holes at the extreme ends of sections 33' and 33" respectively. Holes 34 in base flange 35' should be threaded to receive the shank of bolt 42'.

The several angle bars, rails, and other members of the device are preferably made of tool steel, but they could be extruded or cast aluminum, or other suitable material.

While I have illustrated and described the preferred embodiments of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A mitering structure, comprising a flat rectangular table having a pair of parallel grooves therein, and a rectangular frame having a pair of parallel rails slidably disposed in said grooves, a pair of angle bars disposed transversely across the rails at the ends thereof, each of the rails having a plurality of spaced threaded apertures therein, another angle bar disposable at a predetermined angle across the rails, said other angle bar having a plurality of spaced holes in a base flange thereof, a flat rail slidably disposed along the base flange, said flat rail having a projecting head arranged coplanar with an upstanding wall of said other angle bar, a pair of bolts passing through the holes in the other angle bar and threaded in said pair of rails to fix said other angle bar in a predetermined angular position with respect to the rails, a movable stop member removably secured to an upstanding wall of said other angle bar, said stop member including an inverted U-shaped wall portion with an outwardly extending stop element thereon, and another bolt threaded in said wall portion for fixing the position of the stop member on said wall portion, said upstanding wall and base flange having a recess therein for receiving a rotating saw blade.

2. A mitering structure, comprising a flat rectangular table having a pair of parallel grooves therein, and a rectangular frame having a pair of parallel rails slidably disposed in said grooves, a pair of angle bars disposed transversely across the rails at the ends thereof, each of the rails having a plurality of spaced threaded apertures therein, another angle bar disposable at a predetermined angle across the rails, said other angle bar having a plurality of spaced holes in a base flange thereof, a flat rail slidably disposed along the base flange, said flat rail having a projecting head arranged coplanar with an upstanding wall of said other angle bar, a pair of bolts passing through the holes in the other angle bar and threaded in said pair of rails to fix said other angle bar in a predetermined angular position with respect to the rails, a movable stop member removably secured to an upstanding wall of said other angle bar, said stop member including an inverted U-shaped wall portion with an outwardly extending stop element thereon, means for fixing the position of the stop member on said wall portion, and means on the upstanding wall and base flange receiving a rotating saw blade.

References Cited in the file of this patent
UNITED STATES PATENTS

| | | |
|---|---|---|
| 113,531 | King | Apr. 11, 1871 |
| 271,408 | Brennan | Jan. 30, 1883 |
| 438,029 | Strahl | Oct. 7, 1890 |
| 812,574 | Linton | Feb. 13, 1906 |
| 1,429,097 | Phillips | Sept. 12, 1922 |
| 1,566,225 | Mills | Dec. 15, 1925 |
| 2,381,564 | Taylor | Aug. 7, 1945 |
| 2,535,843 | Curtis | Dec. 26, 1950 |
| 2,613,707 | Giles | Oct. 14, 1952 |
| 2,696,854 | Woodruff | Dec. 14, 1954 |
| 2,711,194 | Fisher | June 21, 1955 |